Sept. 15, 1942.  L. PREISMAN  2,296,118
PROCESS OF PRODUCING HYDROFLUORIC ACID LOW IN FLUOSILICIC ACID
Filed April 8, 1940
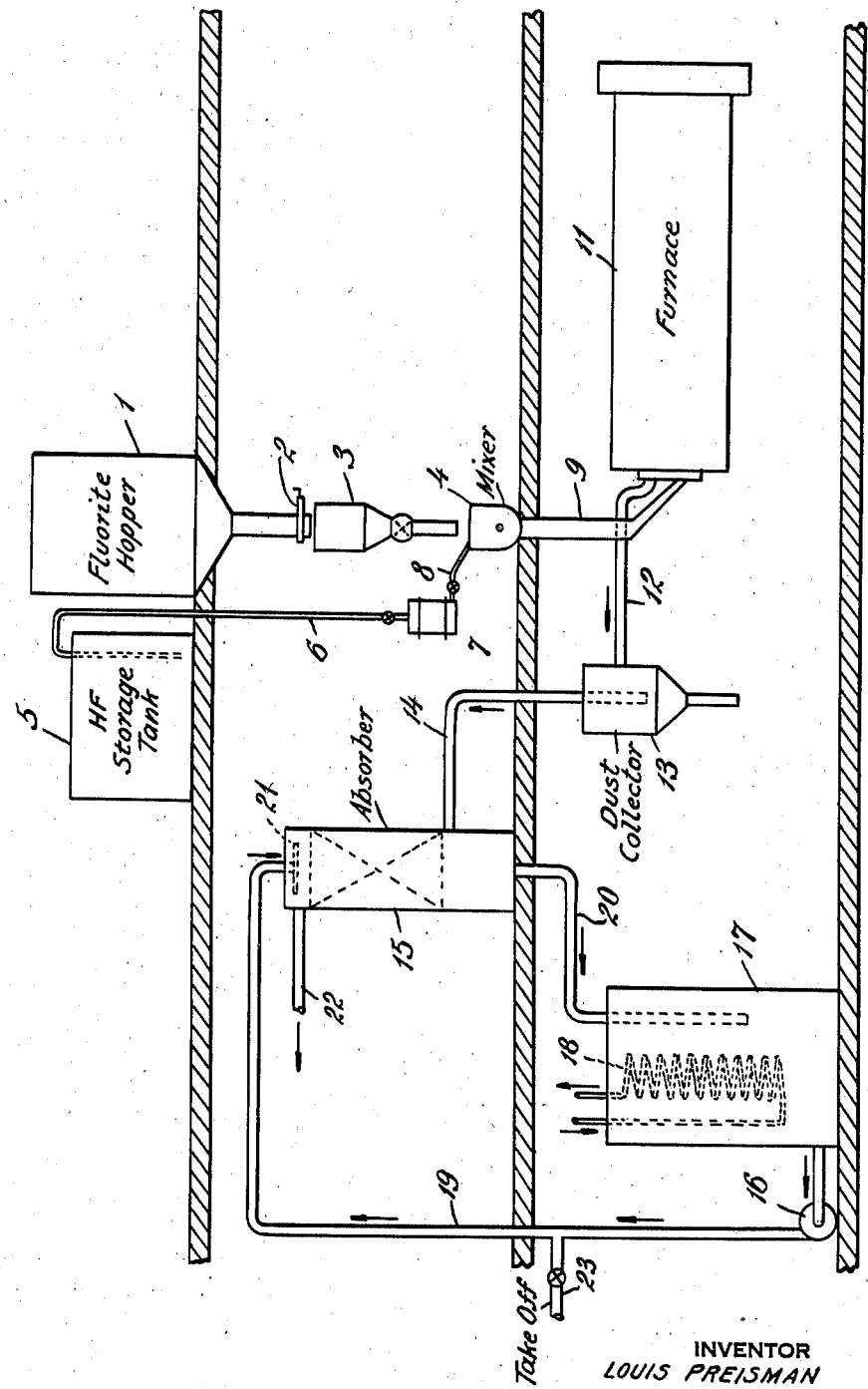
INVENTOR
LOUIS PREISMAN
BY
ATTORNEY Patented Sept. 15, 1942

2,296,118

UNITED STATES PATENT OFFICE 2,296,118

PROCESS OF PRODUCING HYDROFLUORIC ACID LOW IN FLUOSILICIC ACID

Louis Preisman, Cleveland, Ohio, assignor to General Chemical Company, New York, N. Y., a corporation of New York Application April 8, 1940, Serial No. 328,477

7 Claims. (Cl. 23—153)

This invention relates to a process of preparing hydrofluoric acid substantially free, or having a low content of fluosilicic acid.

One commonly used commercial method of making hydrofluoric acid involves the treatment of fluorites such as fluorspar with concentrated sulfuric acid, the heating of the resultant mixture in a suitable furnace, and the absorption of the exit gases in water to form the hydrofluoric acid solution. In this process the silica present in the fluorite is volatilized as silicon tetrafluoride which is absorbed along with the hydrofluoric acid gas appearing in the hydrofluoric acid as fluosilicic acid. Generally, it is important to obtain a hydrofluoric acid substantially free or having a low content of fluosilicic acid. Accordingly, to avoid the contamination of the hydrofluoric acid by fluosilicic acid, fluorites having a low silica content, below 1.0% have been used. Such fluorites are difficult to obtain, and furthermore, are expensive. Fluorites containing up to about 3.0% silica, on the other hand, are plentiful and comparatively inexpensive.

United States Patent 1,875,200 of August 30, 1932, discloses the treatment of fluorites having a relatively high content of silica by treatment of the fluorite with sulfuric acid of a concentration of between 70 and 90% $H_2SO_4$ and heating the resultant mixture to a temperature of from 70° to 120° C. The specification of this patent points out that to obtain a hydrofluoric acid "which is as anhydrous as possible" after treatment of the fluorite with sulfuric acid of a concentration between 70 and 90% $H_2SO_4$, the concentration of the acid is increased by the addition of fuming sulfuric acid. In carrying out the process of this patent it was found that the best removal of silica obtainable was of the order of 33% of the total silica content originally present in the fluorite, i. e. a reduction of 33% in the silica content of the raw material was possible. Further, the process of the patent required very careful temperature control, a factor which obviously is objectionable in commercial operation. Also, the use of fuming sulfuric acid in the process of this patent, involving, as it does, a reagent which is relatively expensive and which is difficult to handle, renders the process of this patent not readily adaptable to the commercial production of hydrofluoric acid.

It is an object of this invention to provide a process of producing hydrofluoric acid resulting, in an acid substantially free of or low in fluosilicic acid from fluorites relatively high in silica, e. g. up to about 3.0%, which process can readily be carried out in a comparatively inexpensive manner and results in a reduction of the silica content of the fluorite to a substantially greater extent than is possible by the process of United States Patent 1,875,200. Another object of the invention is to provide a process of producing hydrofluoric acid substantially free or having a low content of fluosilicic acid, which process results in the production of fluosilicic acid or sodium fluosilicate as a by-product. Other objects and advantages of this invention will appear from the following detailed description thereof.

I have made the surprising discovery that the silica content of fluorites such as fluorspar containing up to 3.0% silica can be reduced to a substantialy greater extent than is possible by the process of said patent by treating the fluorite with hydrofluoric acid of a concentration of between 30 and 40%, preferably about 36%, in amount so that the weight ratio of hydrofluoric acid to silica ($SiO_2$) is equivalent to from 1:1 to 2.5:1. In order to economize on the amount of hydrofluoric acid employed in the process preferably the weight ratio of acid to silica used is about 1.67:1; with this ratio of acid to silica, I have found, the silica content can be reduced as much as about 70%, and with a higher ratio, e. g. 2.5:1, the silica content can be reduced as much as 90%. The treatment may be carried out by mixing the fluorite containing silica in excess of 1.0% with the hydrofluoric acid in the concentration and amount stated, for example, in a pug mixer, to produce a damp and crumbly but not sticky mix, and then heating this mix in a furnace to a temperature of approximately 200° C. for one to two hours. The gases produced in this heating step, constituted of $SiF_4$, HF, $H_2O$ and $CO_2$, may be passed through a dust collector and then into an absorbing system where they are scrubbed with a circulating solution of fluosilicic acid of the same composition as that produced by condensing the gases. A fluosilicic acid of about 35% concentration is thus obtained. This acid may be reacted with soda ash to form sodium fluosilicate.

As above indicated, the treatment hereinabove described, involving the use of a weight ratio of hydrofluoric acid to silica of 1.67:1, results in a reduction of the silica content of the fluorites of the order of about 70%, producing, in the case of fluorites containing up to about 3.0% silica, a fluorite containing less than about 1.0% $SiO_2$. This fluorite may be treated with sulfuric acid in accordance with the usual procedure to produce hydrofluoric acid substantially free of or low in fluosilicic acid.

The accompanying drawing illustrates a preferred layout of apparatus for practicing the process of this invention.

In this drawing, reference numeral 1 identifies a hopper for the reception of ground fluorspar or other fluorite; this hopper is provided with a valve controlled outlet 2 communicating with a weighing hopper 3. Hopper 3 supplies a weighed charge of fluorite to a mixer 4. A storage tank 5 for hydrofluoric acid is in communication by means of a valve controlled pipeline 6 with a feed boot 7 which is designed to supply a measured amount of hydrofluoric acid to the mixer 4 through valve controlled pipe 8.

The mixer 4 communicates by means of pipeline 9 with the furnace 11. Exit gases from the furnace 11, as indicated by the arrows on the drawing, pass through flue 12 to dust collector 13 and thence through pipeline 14 to a packed absorption tower 15. Fluosilicic acid is circulated through the absorption tower 15 by means of a pump 16 which pumps fluosilicic acid from tank 17 provided with a cooling coil 18 through pipeline 19 which supplies the acid to a distributor head 21 in the absorber 15. Fluosilicic acid solution flows from the bottom of the absorber 15 through line 20 into the tank 17. The direction of flow through the absorber 15, tank 17 and connecting lines is indicated on the drawing by the arrows associated with these parts.

Uncondensed gas leaves the absorber 15 through pipeline 22 which may connect with a fan for drawing the gas through the system. Fluosilicic acid may be withdrawn as desired from the circulating stream through the valve controlled takeoff pipe 23 and passed to storage or treated with soda ash to form sodium fluosilicate.

The following example illustrates a preferred embodiment of the invention; it will be understood that this invention is not limited to this example.

Ground fluorspar containing about 2.3% silica was mixed with 36% hydrofluoric acid in amount equal to about 217 pounds of acid per ton of spar, the weight ratio of acid to $SiO_2$ being equivalent to 1.67:1. A pug mixer was used for this purpose and produced a damp, crumbly, but not sticky, mix. This mix was then fed to an externally fired rotary furnace where it was heated to approximately 200° C. for 1 to 2 hours. Approximately 70% of the silica content was driven off during this heating, the silicon tetrafluoride passing through the gas exit line along with unreacted acid, water vapor, and usually some carbon dioxide. Calcium fluoride, containing not more than about 0.8% silica, was discharged from the furnace and later treated with concentrated sulfuric acid to produce hydrofluoric acid containing about 1.8% fluosilicic acid.

The exit gases from the furnace, after being cleaned by passage through a dust collector, were scrubbed with a 35% fluosilicic acid solution. Fluosilicic acid of 35% concentration resulted. This acid can be disposed of as such as a salable product or reacted with soda ash to form sodium fluosilicate.

It is to be understood that this invention is not restricted to the present disclosure otherwise than as defined by the appended claims.

What is claimed is:

1. A process of producing hydrofluoric acid low in fluosilicic acid from a fluorite containing in excess of 1.0% but not more than about 3.0% silica, which comprises treating the fluorite with hydrofluoric acid of between 30 to 40% concentration, in amount such that the weight ratio of hydrofluoric acid to silica present in the fluorite is within the range of from 1:1 to 2.5:1, by heating the mixture of fluorite and hydrofluoric acid to drive off silicon fluoride, thereby reducing the silica content so that the fluorite contains less than about 1.0% silica, and treating the resultant fluorite with sulfuric acid to produce hydrofluoric acid low in fluosilicic acid.

2. A process of producing hydrofluoric acid from fluorspar containing in excess of 1.0% but not more than about 3.0% silica, which comprises adding hydrofluoric acid of 30 to 40% concentration to the fluorspar to produce a mixture having a weight ratio of hydrofluoric acid to silica of about 1.67:1, heating the resultant mixture to a temperature of about 200° C. to drive off silicon fluoride and produce a calcium fluoride residue containing less than 1.0% silica, and treating this residue with sulfuric acid to produce hydrofluoric acid.

3. A process of producing hydrofluoric acid from fluorspar containing in excess of 1.0% but not more than about 3.0% silica, which comprises adding hydrofluoric acid of about 36% concentration to the fluorspar to produce a mixture having a weight ratio of hydrofluoric acid to silica of about 1.67:1, heating the resultant mixture to a temperature of about 200° C. to drive off silicon fluoride and produce a calcium fluoride residue containing less than 1.0% silica, and treating this residue with sulfuric acid to produce hydrofluoric acid.

4. A process of producing hydrofluoric acid from fluorites containing in excess of 1.0% but not more than about 3.0% silica, which comprises treating the fluorites with hydrofluoric acid of 30 to 40% concentration in amount such that the weight ratio of hydrofluoric acid to silica present in the fluorites is within the range of from 1:1 to 2.5:1, heating the resultant mixture to drive off silicon fluoride, condensing the exit gases by absorbing them in a fluosilicic acid solution to produce fluosilicic acid, and treating the reaction mixture from which the silica has been driven off with sulfuric acid to produce hydrofluoric acid.

5. A process of producing hydrofluoric acid, and, as a by-product, fluosilicic acid, from fluorspar containing in excess of 1.0% but not more than about 3.0% silica, which comprises mixing hydrofluoric acid of about 36% concentration with the fluorspar in such proportion that the weight ratio of hydrofluoric acid to silica is about 1.67:1, heating the resultant mixture for one to two hours at a temperature of 200° C. to drive off silicon fluoride and produce a calcium fluoride containing less than 1.0% silica, condensing the exit gases from the aforesaid heating step by absorbing them in a 35% fluosilicic acid solution to produce fluosilicic acid of about 35% concentration, and treating the calcium fluoride containing less than 1.0% silica with sulfuric acid to produce hydrofluoric acid.

6. A process of reducing the silica content of fluorites containing in excess of 1.0% but not more than about 3.0% silica to a value below 1.0%, which comprises mixing the fluorites with hydrofluoric acid of a concentration of between 30 and 40%, in amount such that the weight ratio of hydrofluoric acid to silica is within the range of from 1:1 to 2.5:1 and heating the resultant mixture to drive off silicon fluoride and reduce the silica content to a value below 1.0%.

7. A process of reducing the silica content of fluorspar containing in excess of 1.0% but not more than about 3.0% silica, which comprises mixing fluorspar with hydrofluoric acid of about 36% concentration in such proportion that the weight ratio of hydrofluoric acid to silica is equal to about 1.67:1, and heating this mixture to a temperature of about 200° C. for one to two hours to reduce the silica content to a value below 1.0%.

LOUIS PREISMAN.